Patented Feb. 20, 1940

2,191,300

UNITED STATES PATENT OFFICE 2,191,300

INSECTICIDE

Lloyd E. Smith, Washington, D. C., assignor to Henry A. Wallace, as Secretary of Agriculture of the United States of America, and his successors in office No Drawing. Application October 3, 1939, Serial No. 297,728

4 Claims. (Cl. 167—30)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

My invention relates to the improvement in materials for destroying or checking the growth or multiplication of living organisms, whether plant or animal, which are economically injurious to men.

An object of this invention is to provide a material for use as an insecticide.

Another object of this invention is to provide a material which is relatively non-toxic to man and warm blooded animals when taken by mouth and which can be used in the place of lead arsenate and other arsenicals commonly used for destroying insects without leaving a harmful residue on fruits and vegetables.

I have found that the class of compounds known as iodosobenzenes and the nitro derivatives thereof are effective in killing many species of insects whether applied externally or internally; that these organic compounds may be sprayed or dusted upon delicate foliage without injuring it; that these compounds are as effective as lead arsenate and other commonly used insecticides and that they are relatively non-toxic to warm blooded animals.

These compounds may be reduced to impalpable powder by grinding and applied to vegetation either dry as a dust or wet as a spray. The products being soluble in oils may be applied as a component of an oil emulsion spray. When applied as a spray in water it may be desirable to incorporate an effective wetting agent, such as one of the so-called sulfonated oils. For certain purposes the addition of a suitable adhesive or "sticker" may be advisable. These products may also be applied by dissolving them in an appropriate solvent such as acetone and pouring the resulting solution into water whereupon a fine colloidal precipitate is formed. This may be applied directly to the host plant or may be combined with a suitable wetting agent or adhesive and then sprayed. As examples of the toxicity of this class of compounds, the following results were obtained:

When tested against corn borer larvae at a concentration of 1 pound in 100 gallons of water, iodosobenzene gave a 90.5% kill. The minimum lethal concentration to give 100% kill of the screw worm larvae, using this compound, was found to be 0.1–0.166%.

At a concentration of 340 micrograms per square centimeter o-iodosonitrobenzene gave 100% kill of the Colorado potato beetle, Southern army worm and the diamondback cabbage worm and Southern webworm and the Hawaiian beet webworm.

p-Iodosonitrobenzene when used at a concentration of 2 pounds in 50 gallons of water gave a kill of 95.4% of the codling moth larvae. The minimum lethal concentration of this compound that gave 100% control of the screw worm larvae was found to be 0.05–0.075%.

Having thus described my invention, I claim:
1. An insecticide containing as its essential active ingredient iodosobenzene.
2. An insecticide containing as its essential active ingredient o-iodosonitrobenzene.
3. An insecticide containing as its essential active ingredient m-iodosonitrobenzene.
4. An insecticide containing as its essential active ingredient p-iodosonitrobenzene.

LLOYD E. SMITH.